(12) United States Patent
Hatlan et al.

(10) Patent No.: US 6,176,637 B1
(45) Date of Patent: Jan. 23, 2001

(54) CORNER MOULDING AND IMPROVED CORNER CONSTRUCTION

(75) Inventors: James T. Hatlan, Duluth; David Ayres, Austell, both of GA (US); Andrew Skros, Lineville; Donna Furst, Oxford, both of AL (US)

(73) Assignee: ABC School Supply, Inc., Duluth, GA (US)

( * ) Notice: Under 35 U.S.C. 154(b), the term of this patent shall be extended for 0 days.

(21) Appl. No.: 09/263,751

(22) Filed: Mar. 5, 1999

(51) Int. Cl.$^7$ ................................ F16B 9/00; B25G 12/36
(52) U.S. Cl. ................ 403/231; 52/717.04; 52/288.1; 52/716.4; 403/230; 403/205; 403/292
(58) Field of Search .................................... 403/231, 403, 403/205, 401, 402, 267, 268, 292, 404, 230; 52/287.1, 288.1, 716.1, 716.3, 716.4, 717.03, 717.05, 717.06, 717.04

(56) References Cited

U.S. PATENT DOCUMENTS

| | | |
|---|---|---|
| 2,388,297 * | 11/1945 | Slaughter . |
| 3,338,012 * | 8/1967 | Kappenhagen et al. . |
| 4,196,553 * | 4/1980 | Veach . |
| 4,383,397 * | 5/1983 | Ward . |
| 4,477,201 * | 10/1984 | Yoshiyuji ............................ 403/231 |

* cited by examiner

Primary Examiner—Lynne H. Browne
Assistant Examiner—Tomlyne A. Malcolm
(74) Attorney, Agent, or Firm—Womble Carlyle Sandridge & Rice

(57) ABSTRACT

The present invention is a corner molding particularly useful in the construction of juvenile furniture. The corner molding has an elongate body with an interior, a first rounded side, and a second side opposite the rounded side, with a pair of acutely V-shaped channels extending along the length of the body. The first rounded side and each of the V-shaped channels preferably form a pair of rounded outer edges therebetween. Each V-shaped channel receives a substantially rectangular edge of a planar member to form a rounded corner such that the planar members are held substantially perpendicular relative to each other, with smooth joints between the outer edges and planar members. The present invention further provides a method of attaching a pair of planar members within acutely V-shaped channels of a corner molding to thereby provide a rounded corner having smooth joints between the planar members and the corner molding.

22 Claims, 4 Drawing Sheets

CORNER MOULDING AND IMPROVED CORNER CONSTRUCTION

BACKGROUND OF THE INVENTION

1. Field of the Invention

The present invention generally relates to furniture construction. More particularly, the present invention relates to a corner construction which incorporates a corner moulding for joining two planar members together to form a rounded corner.

2. Description of the Related Art

Corner mouldings are known in the art that join two planar members together such that the planar members are substantially perpendicular to each other, and the corner moulding provides a rounded edge between the two rectangular edges of the planar members. The prior art corner mouldings include those having elongate bodies, a rounded side, a planar side opposite the rounded side, and a plurality of V-shaped channels (sometimes referred to herein as "docking channels") therebetween. The V-shaped channels of the prior art corner mouldings are formed at a right angle, i.e. 90° (sometimes referred to herein as a "docking angle"), to precisely accommodate (or "dock") the rectangular edge of a planar member.

Thus, the planar members are fitted at their rectangular edges into the 90° V-shaped channels of the prior art corner moulding and then fastened therein. The prior art corner moulding is fastened using such methods as adhesives, dowels fastened within a plurality of holes bored within the corner moulding and the rectangular edge of the planar member, and screws inserted through the lower planar side of the prior art corner moulding and imbedded into the planar member. A rough joint is formed between each outer edge of the planar member and the rounded side of the corner moulding, and such joint requires putty or other filler to be placed therein to cure. Thus, the sealed rough joint prevents any injurious contact from the sharp outer edges of the planar members.

There are other corner mouldings known in the prior art which include a third V-shaped channel opposite the rounded side, where a pair of legs extend to form the V-shaped third channel into which a notched rectangular edge of a planar member fits such that an interior corner is made by the third V-shaped channel when the planar members are attached to the corner moulding. Joints are still present between the sharp outer edges of the planar members and the rounded side of the corner moulding, which still requires putty or other filler to be placed into the joints.

A significant problem with using putty or filler to seal the joint between the sharp outer edges planar members and the rounded side of the prior art corner moulding is that the putty or other filler can degrade over time and fall out, thus presenting one with a sharp edge that requires putty or filling to be used again. Furthermore, when such corner moulding is used in juvenile furniture, where play and interaction by children can provide significant forces and contact with the corner moulding and planar edge, the possibility that putty could fall out of the seam may prove too much of a safety risk and preclude such corner moulding from use in juvenile furniture.

An additional detriment to the prior art corner moulding which includes a third V-shaped channel opposite the rounded side, and a pair of legs to form the third V-shaped channel, is that the planar members require subsequent modification on the rectangular edges to create notches (to fit the legs) of the prior art moulding in order to form the rounded corner with an interior corner therein. Thus, extra time and energy must be expended in order to form such a corner, and the structural detriments (as discussed above) heavily disfavor such usage in situations where significant forces may be applied to the joint, such as in juvenile furniture.

It is thus seen that the prior art has several shortcomings in that to form a satisfactory rounded corner between two planar members, additional time consuming steps must be made. Further, the step of placing putty or filler in the joint between the outer edges of the rounded side and the planar members and/or specially modifying the planar members to fit in a specialized corner moulding only provides a short term solution to the safety and aesthetic problems of sharp edges, and adds cost to the construction of such a rounded corner. The present invention is therefore directed to the provision of a corner moulding that will address and solve these problems and shortcomings of the prior art.

SUMMARY OF THE INVENTION

Briefly described, the present invention comprises an improvement upon the prior art corner mouldings (and resultant corner constructions) which improvement comprises a modification to the docking angle of the docking channel of a prior art corner moulding. The inventive modification of the present invention results in an acute angle.

In one preferred embodiment thereof, the present invention is a corner moulding comprised of an elongate body having an interior, a first rounded side, a second side opposite the rounded side, where the elongate body further has a pair of V-shaped docking channels extending along its length, and each channel is between the first rounded side and the second side. A pair of outer edges are formed between the first rounded side in each of the channels, and the outer edges are preferably rounded such that a smooth joint is created between the substantially rectangular edges of a planar member placed within the V-shaped channel and the outer edge.

Each V-shaped channel includes a first interior wall adjacent the first rounded side and a second interior wall between the first interior wall and the second side. The first interior wall and second interior wall form an acute angle in a range of 83°–89°, with 88° most preferred. In accordance with the preferred embodiment, the planar member rests against the second interior wall such that the outer edge of the corner moulding is tightly held against the outer edge of the substantially rectangular end of the planar member. A variety of methods as known in the art to attach the planar members to the corner moulding can alternately be used, including the use of screws, adhesives, and holes formed in the corner moulding and the edge of the planar member with a dowel securing planar member to the moulding.

Thus, it can be seen that the present invention provides, in one embodiment, an inventive corner construction comprised of the corner moulding which has an elongated body with a first rounded side, a side opposite the rounded side, and a pair of V-shaped channels extending along the length of the body, where each of the V-shaped channels is at an acute angle, and a pair of planar members, each of which has at least one substantially rectangular edge rigidly held within the V-shaped channels such that the planar members are held substantially perpendicular to each other thereby creating a rounded corner. Further, in the preferred embodiment, the combination has tight joints between the outer edges of the rounded side and the substantially rectangular edges of the planar members. The combination likewise includes the various methods of attachment of the planar members to the corner moulding, including the methods disclosed herein, as well as those known in the art.

The present invention further provides a method of attaching a pair of planar members to a corner moulding where the corner moulding has a first rounded side, a second side opposite the first rounded side, and a pair of acutely V-shaped channels where each substantially rectangular edge is placed within one of the V-shaped channels, and attached therein. Such attachment thereby forms a rounded corner having tight and smooth joints between the outer edges of the rounded side of the corner moulding and each planar member. The step of attaching the substantially rectangular edge within the V-shaped channels is alternately performed in the methods discussed above, and through other methods as known in the art.

Therefore, the primary object of the present invention is to provide an inventive corner moulding which is used to create a rounded corner between two planar members such that each planar member is held substantially perpendicular to each other and tight, smooth joints exist between the outer edges of the rounded side of the corner moulding and the planar members such that no putty or filler is needed. Further, the present invention provides a corner construction comprised of a rounded moulding and attached planar members which results in a smooth rounded corner with smooth, tight transitions to the planar members. The safety features of the present invention are accordingly particularly useful in the construction of juvenile furniture.

Other objects, features, and advantages of the present invention will become apparent after review of the hereinafter set forth Brief Description of the Drawings, Detailed Description of the Invention, and Claims appended herewith.

DETAILED DESCRIPTION OF THE INVENTION

Figure 1:
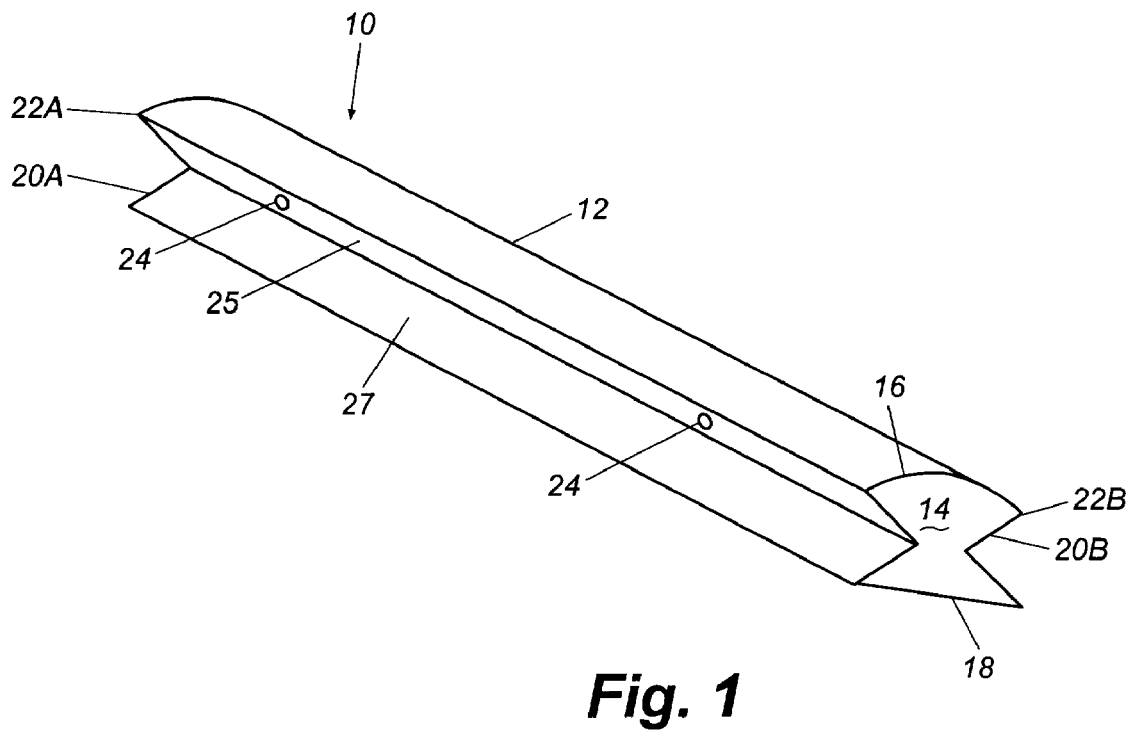
FIG. 1 is a perspective view of the preferred embodiment of the corner moulding.

Referring now in greater detail to the drawings, in which like numerals represent like components throughout the several views, FIG. 1 is a perspective view of the present inventive corner moulding 10, in accordance with a preferred embodiment of the present invention, illustrating the elongate body 12 of the corner moulding 10 which preferably has a solid interior 14 thereof However, the elongate body 12 is alternately constructed with one or more hollow portions therein, provided the use of the hollow portion does not adversely effect the character of the corner moulding as described herein, and also dependent upon material used for construction thereof The elongate body 12 of the preferred embodiment of FIG. 1 has a first rounded side 16 and a second, substantially planar side 18 opposite the rounded side 16, and a pair of V-shaped docking channels 20A and 20B between the first side 16 and the second side 18, and the V-shaped channels 20A and 20B are directed towards the interior 14 of the body 12. Each V-shaped channel 20A, 20B has a first interior wall 25 adjacent the first side 16, and a second interior wall 27 between the first wall 25 and second side 18. A pair of rounded outer edges 22A and 22B are formed between the first side 16 and the V-shaped channels 20A and 20B. The embodiment disclosed in FIG. 1 further includes holes 24 (of which, for example, two holes 24 are shown in channel 20A of FIG. 1) formed in the V-shaped channel 20A, 20B for the use of dowels in attachment of planar members 30 (see FIG. 3).

Figure 2A:
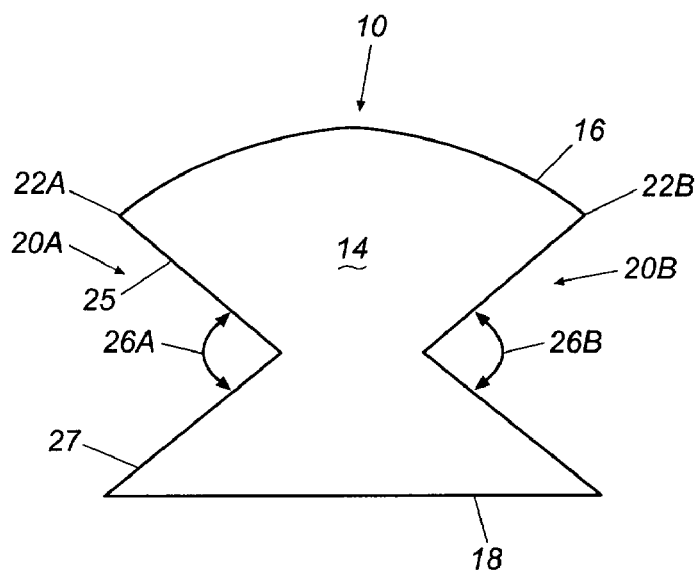
FIG. 2A is an end view of the corner moulding of FIG. 1.
Figure 2B:
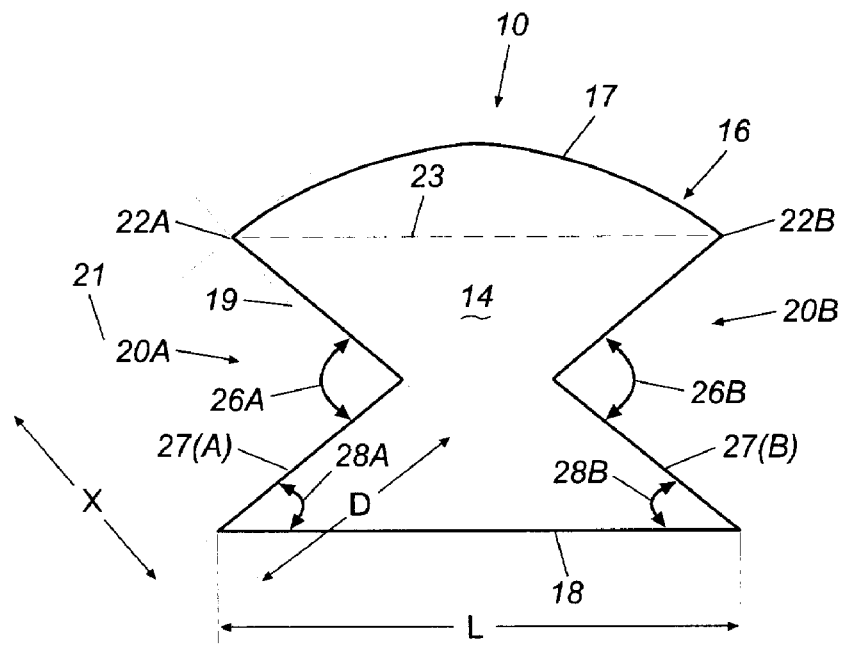
FIG. 2B is an enlargement of FIG. 2A depicting certain preferred characteristics.

FIG. 2A illustrates the preferred embodiment of the corner moulding 10 in end view. FIG. 2A particularly shows that the docking angles of the V-shaped docking channels 20A, 20B, angles 26A, 26B, are acute angles, preferably in a range of 83°–89°, with 88° being preferable. Whereas the introduction of an acute angle as the channel angle 26A, 26B is itself considered an inventive improvement upon the prior art mouldings, certain dimensional and geometric characteristics are preferred and further define the preferred inventive improvements. With reference to FIG. 2B, it is shown that the preferred embodiments of the corner moulding 10 include a rounded side 16 defining an arcuate surface 17 which comprises a 90° arc (whose end points 22A, 22B have been preferably (though not necessarily) rounded). The second side 27 of the docking channel 20A is seen as, preferably, lying in a plane whose edge (as seen in FIG. 2B) is perpendicular to the radial line 19 defining the end point 22A of the arcuate surface 17. Thus, the second side surface 27 is parallel to a line 21 drawn tangent to the arcuate surface 17 at the point of intersection of the arc and the radial line 19 defining the end point of the arc. Furthermore, in the preferred dimensions, the distance ("X") from the tangential line 21 to the second side 27 of the docking channel, measured along the radial line 19, is made to be approximately equal to the width of a board or other planar member 30A (see later corner construction examples) which is intended to be eventually interfaced with corner moulding 10. The characteristics of the other docking channel 20B are similar to those described above with respect to the channel 20A.

Figure 2C:
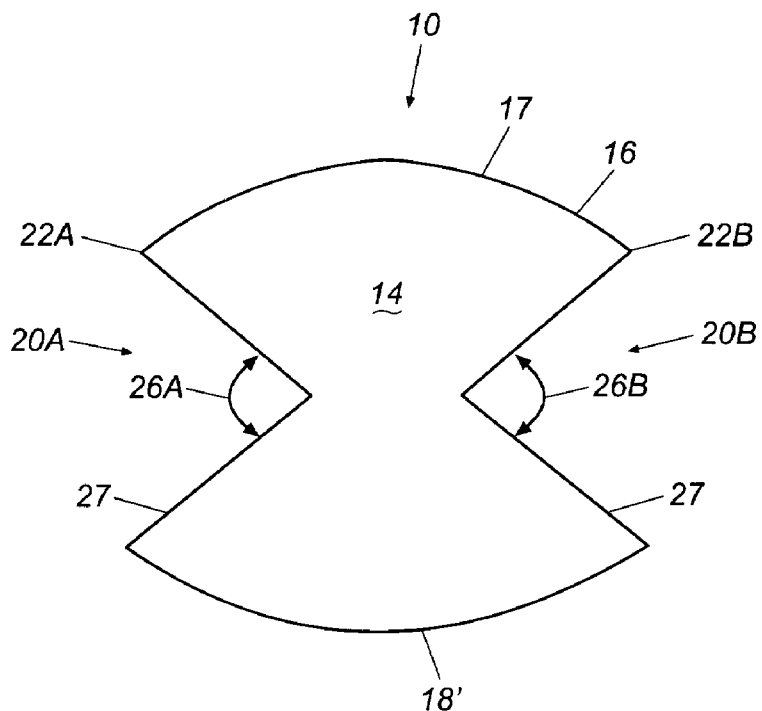
FIG. 2C is an end view of a corner moulding in accordance with the present invention, depicting an alternate embodiment thereof.

In an alternate embodiment, such as seen in FIG. 2C, the opposing side 18', opposing the arcuate surface 17, is acceptably, also, an arcuate surface, or a surface of other geometry (one example being shown in FIG. 3C by dashed lines). However, in the most preferred embodiments, this opposing side 18 is a straight line surface, as depicted in FIGS. 2*a* and 2*b*. In the preferred geometry of FIG. 2B, the opposing side surface 18 lies in a plane which in end view, as seen in FIG. 2B, defines a surface line parallel to the chord 23 defining the 90° arc of the arcuate surface 17. As such, the second side 27 of the one docking channel 20A and the second side 27 of the other docking channel 20B are equal in their depth dimension (that dimension D seen in the end view of FIG. 2B), and the lower angles 28A, 28B formed between each second side 27 and the opposing surface 18 are, in the preferred geometry, 45° angles. The dimension D is, preferably, of sufficient length so as to provide a desirable amount of support for and structural mounting surface for connection of the moulding to a planar member (as seen in later corner construction embodiments). In the most preferred embodiment, such as depicted in FIG. 2b, the geometry and dimensions of the second sides 27 and the opposing side 18 are such that the opposing side 18 defines in end view (as seen in FIG. 2B) a length "L" approximately equal to the length of the chord 23 of the circle defined by the arc 17 of the rounded side 16.

Figure 3:
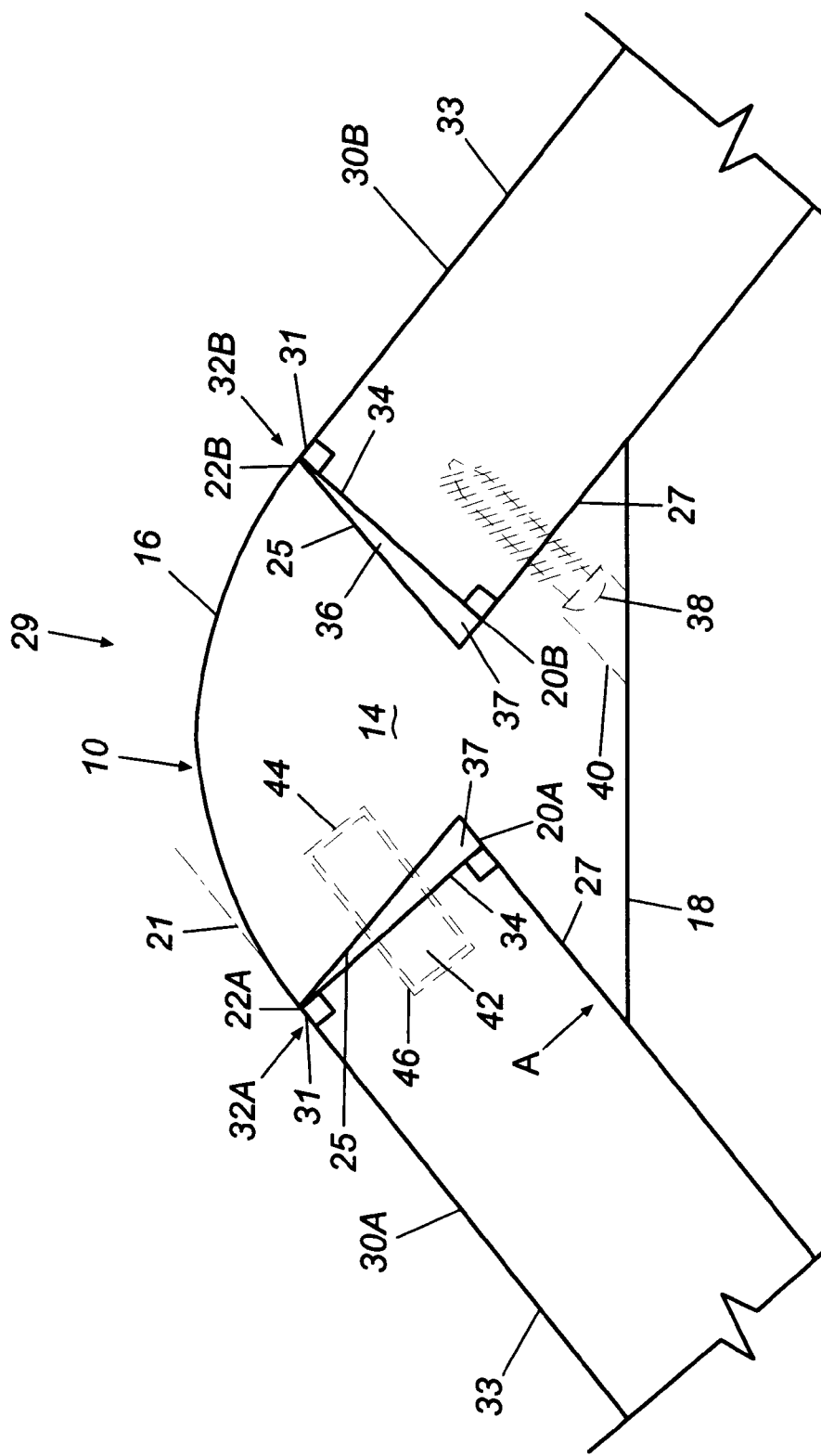
FIG. 3 is a cross-section of the corner moulding of FIG. 1, illustrating a plurality of planar members rigidly attached within the acutely V-shaped channels of the corner moulding, and various methods of attachment.

FIG. 3 illustrates an end view of the present inventive corner construction 29 in accordance with a preferred embodiment of the present invention, resulting from the combination of the present inventive corner moulding 10 and a plurality of planar members 30A and 30B with outer edges 31 of the substantially rectangular end 34. When the planar members 30A and 30B are attached, in accordance with the present invention, to the corner moulding 10, tight joints, shown as joints 32A and 32B, are formed between each planar member 30A, 30B and the respective outer edge 22A, 22B of the corner moulding 10. In creating the rounded corner construction 29, the substantially rectangular end 34 of each planar member 30A, 30B is placed within the respective V-shaped channel 20A, 20B of the corner moulding 10 and specifically against the second interior wall 27. As the rectangular end 34 is generally rectangular, i.e. having, in shown end view of FIG. 3, a pair of 90° angles at its respective corners, moving the rectangular end 34 into the acute (i.e. less than 90°) V-shaped channel 20A, 20B preferably results in the outer edge 31 of the rectangular end 34 first abutting the respective outer edge 22A, 22B of the moulding 10, without interference from the first interior wall 25 of the docking channel, in order to make a tight outer joint 32A, 32B. The use of the acute angle particularly forces the planar member against the outer edges 22A, 22B of the corner moulding 10, and the securing of the planar member 30A, 30B causes the outer edge 31 of the planar member 30A, 30B to tightly abut the rounded outer edge 22A, 22B to form the tight, smooth joint 32A, 32B. A gap 37 is created between the rectangular edge 34 and the remaining surface of the second interior wall 25 of the V-shaped docking channel 20A, 20B. An intent and desired result of the corner construction in accordance with the present invention is to provide tight and smooth transitional joints 32A, 32B that minimizes the need for putty or filler at the outer, exposed seam of the points. The gap 37 is acceptably treated with putty or glue, although such filler is not critical to construction of the corner. Any method known in the art to attach planar members, such as planar members 30A and 30B, to a corner moulding, such as corner moulding 10, is acceptably used in the present invention. In accordance with the preferred embodiments of the rounded corner construction 29, the planar members 30A, 30B have a width equal to distance X (see FIG. 2B), the gap 37 is left between the planar members 30A, 30B and V-shaped docking channels 20A, 20B, the outer edges 31 of the planar members abut tightly against the respective outer edge 22A, 22B of the moulding 10, the respective outer edges 31, 22A, 22B are slightly rounded, and the outer surfaces 33 of the planar members lie in the same plane (as seen in FIG. 3) as the tangent lines 21, so as to form the desired, tight, smooth outer transitional joints, 32A, 32B. There are several preferred methods of attachment of the planar members.

A first method is the use of an adhesive 36 in gap 37 between the rectangular edge 34 of planar member 30B and V-shaped channel 20B in corner moulding 10. With pressure being placed on the planar member 30B, adhesive 36 causes bonding between the planar member 30B and the corner moulding 10 to create an adequate rigid joint. A second method of attaching the planar member 30B to a corner moulding 10 in conjunction with or without adhesive 36 is the imbedding of a screw 38 through a pilot hole 40 formed in the planar side 18 of the corner moulding 10 such that the screw 38 is imbedded in the substantially rectangular end 34 of the planar member 30B whereby the planar member 30B is secured to the corner moulding 10. Alternatively, a nail is used in place of the screw 38, with or without pilot hole 40, and the nail likewise embedding into the substantially rectangular end 34.

A further preferred method of attaching the planar member 30A to the corner moulding 10 is through the use of a dowel 42 which is fitted within a hole 44 formed in the V-shaped channel 20A in corner moulding 10 and likewise fits within a hole 46 formed in the substantially rectangular end 34 of planar member 30A. A dowel 42 is then secured in holes 44 and 46, either through pure friction, or an adhesive is alternately applied therearound to effectively bond the dowel 42 within the holes 44 and 46. Further, an adhesive, such as adhesive 36, can also be used between the substantially rectangular edge 35 of planar member 30A and V-shaped channel 20A. Other methods of attachment as known in the art are alternately used to attach the planar members 30A, 30B, into the V-shaped channels 20A, 20B.

It is recommended that the present inventive corner moulding be constructed out of a rigid, or semi-rigid material, such as wood. However, the corner moulding 10 and the planar members, such as planar members 30A and 30B, can both be made from a semi-rigid material, such as plastic and metal. It is important that the corner moulding 10 hold the planar members 20A, 20B in substantially perpendicular alignment, and can withstand the pressures applied thereto, particularly when constructing furniture.

Figure 4:
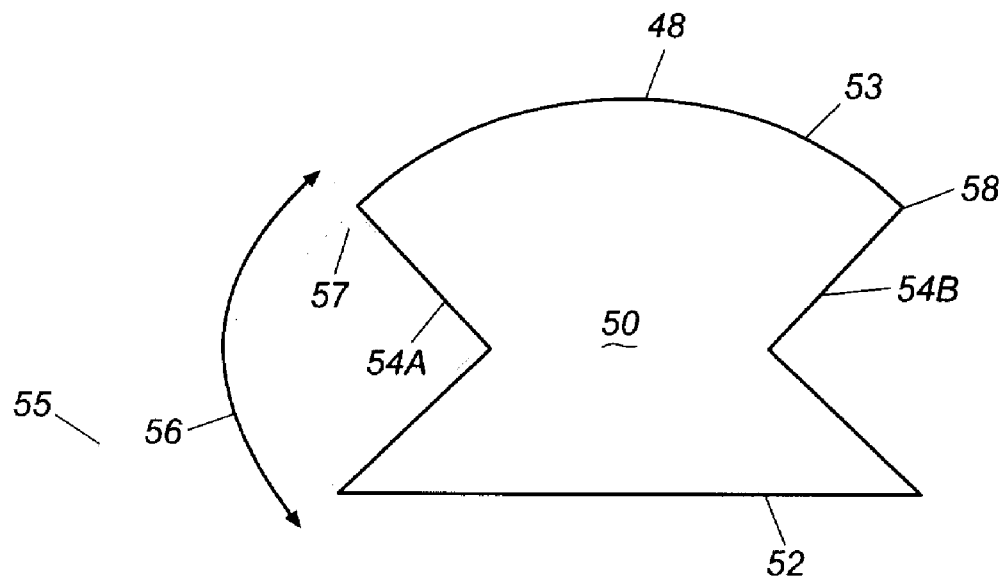
FIG. 4 is a cross-section of a prior art corner moulding, illustrating the V-shaped channels at 90°, and the sharp outer edges between the V-shaped channels and the rounded side.
Figure 5:
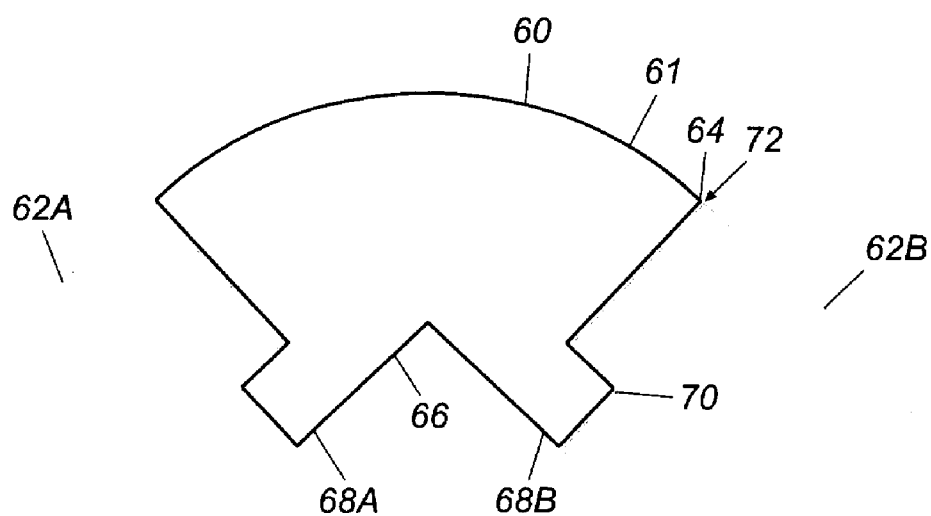
FIG. 5 is a cross-section of another embodiment of a prior art corner moulding with a pair of planar members attached thereto, illustrating a third V-shaped channel opposite the rounded side where the third V-shaped channel forms an interior corner, with the third V-shaped channel having a pair of legs, and notches in the planar members such that the planar members and legs of the corner moulding are in a fitting relationship.

The present inventive corner moulding 10 thus represents a significant improvement over the prior art corner mouldings, such as those shown in FIGS. 4 and 5. FIG. 4 illustrates a prior art corner moulding 48 in cross-section, having an interior 50 thereof, with a planar side 52 opposite the rounded side 53, and a pair of V-shaped channels 54A and 54B directed towards interior 50. The V-shaped channels, such as V-shaped channel 54A are formed by adjacent interior wall surfaces which define a right angle, shown as angle 56, between them. Further, the prior art outer edge 58 between V-shaped channel 54B and rounded side 53 is sharp, and thus, when a planar member 55 is inserted into the V-shaped channel 54B, the sharp edge 57 of the rectangular edge of the planar member and edge 58 require putty or filler to make a smooth joint therebetween.

FIG. 5 shows a separate prior art embodiment of a corner moulding 60, having first a rounded side 61 and a lower third V-shaped channel 66 opposite the first rounded side 61 whereby two legs 68A and 68B are created. A pair of planar members 62A and 62B are modified having a notch, shown as notch 70 in planar member 62B, to fit the legs, such as leg 68B of the corner moulding 60. Such configuration provides an interior corner formed by third V-shaped channel 66 opposite the first rounded side 61 of moulding 60 when the planar members 62A and 62B are attached to corner moulding 60 to form a rounded corner. However, a joint 72 is created between planar member 62B and outer edge 64 of corner moulding 60 which typically requires putty or filler in like manner to the prior art corner moulding 48 disclosed in FIG. 4. Because of this safety concern, the prior art corner mouldings present a problem when used in juvenile furniture, where children are likely to significantly interact with the planar members and outer joints of the rounded corner. The present invention thus has a significant advantage over the prior art mouldings in use in juvenile furniture because of the smooth, putty-less joint created between the planar members 30A and 30B and outer edges 22A and 22B of the corner moulding 10. Additionally, the prior art corner mouldings 48 and 60 require the additional time and energy to put putty or a filler within the joints to make them smooth, and such putty or filler tends to fall out over time and through rigorous interaction.

Moreover, corner moulding 60 in FIG. 5 has a further shortcoming in that a plurality of legs 68A and 68B provide a weak spot of attachment where the planar members 62A and 62B such that significant force placed on the exterior of the attached planar members 62A and 62B can cause a sheering force exerted on legs 68A and 68B, thus causing the corner to break. And the use of third V-shaped channel 66 further weakens the legs 68A and 68B, as the loss of the backing between the legs 68A and 68B cannot withstand the shearing force applied from the substantially rectangular edge of the planar member.

It can thus be seen, the present invention further provides an inventive method of attaching a pair of planar members, such as members 30A and 30B in FIG. 3, to a corner moulding 10 where the rectangular edges 34 and 35 are each placed against the second interior wall 27 of the V-shaped channels 20A and 20B of the corner moulding 10, and then the planar members 30A and 30B are attached at the rectangular edges 34 within the V-shaped channels 20A and 20B of the corner moulding 10, which thereby forces the outer edges 31 of the planar members 20A, 20B against the outer edges 22A, 22B of the corner moulding 10.

While there have been shown the preferred and alternate embodiments of the present invention, it is to be understood that the present invention may be embodied than is otherwise herein shown, and that within such embodiments, changes may be made in the forms and arrangement of the parts without departing from the underlying spirit and scope of the present invention as set forth in the Claims appended herewith. In addition, all means-plus-function language used in the Claims appended herewith is intended to encompass all materials, tools, methods and knowledge known to one of skill in the art to practice the present invention.

What is claimed is:

1. A corner moulding, comprising:
    an elongate body having an interior, a first side defining an arcuate surface, and a second side opposite said first side, said elongate body further having a pair of V-shaped docking channels extending along the length of said body, each said channel being defined between said first side and said second side; and
    each said V-shaped channel defining a first interior wall adjacent said first side and a second interior wall adjacent said first interior wall, and said first interior wall and second interior wall defining an acute angle therebetween;
    wherein the second interior wall of each said docking channel is perpendicular to a radial line defining an end point of the arc defining the arcuate surface of said first side, and said first interior wall of the respective said docking channel intersects said radial line.

2. The corner moulding of claim 1, wherein said acute angle of said V-shaped channel is in a range of 83°–89°.

3. The corner moulding of claim 2, wherein said acute angle of said V-shaped channel is substantially 88°.

4. The corner moulding of claim 3, further including a means for attaching a substantially rectangular edge of a planar member within each said V-shaped channel of said body.

5. The corner moulding of claim 4, wherein said means for attaching a rectangular edge are screws embedded into the substantially rectangular edge of the planar member through said second side of said body.

6. The corner moulding of claim 4, wherein said means for attaching a rectangular edge are nails embedded into the substantially rectangular edge of the planar member through said second side of said body.

7. The corner moulding of claim 4, wherein said means for attaching a rectangular edge comprises:
    at least one hole formed in each said V-shaped channel of said body, and
    a plurality of dowels, each said dowel is rigidly fastened with each said hole in said V-shaped channel, whereby said dowels respectively fit within holes formed in the substantially rectangular edge of a planar member to secure said planar member to said body.

8. The corner moulding of claim 4, wherein said means for attaching a rectangular edge is an adhesive placed upon said V-shaped channels, said adhesive attaching the substantially rectangular edge of the planar member when placed thereagainst.

9. The corner moulding of claim 1, whereby an outer edge is formed between said rounded side and each said V-shaped channel, and wherein each said outer edge is rounded.

10. A corner construction, comprising
    a corner moulding comprising an elongate body having an interior, a first side defining an arcuate surface, and a second side opposite said first side, said elongate body further having a pair of V-shaped channels extending along the length of said body, each said V-shaped channel being between said first side and said second side, and each said V-shaped channel defining a first interior wall adjacent said first side and a second interior wall between said first interior wall and said second side, said first interior wall and said second interior wall forming an acute angle therebetween, wherein the second interior wall of each said V-shaped channel is perpendicular to a radial line defining an end point of the arc defining the arcuate surface of said first side, and said first interior wall of the respective said V-shaped channel intersects said radial line,
    a pair of planar members, each planar member including, at least, one substantially rectangular edge, each planar member rigidly attached to said corner moulding with each said rectangular edge held within said V-shaped channel such that said planar members are held substantially perpendicular to each other; and
    means for attaching each said rectangular edge of said planar member to said V-shaped channels of said corner moulding.

11. The corner construction of claim 10, wherein said acute angle of said V-shaped channel is in a range of 83°–89°.

12. The corner construction of claim 11, wherein said acute angle of said V-shaped channel is substantially 88°.

13. The corner construction of claim 12, wherein the means of attaching each said substantially rectangular edge of said planar members to said V-shaped channels are screws embedded into the substantially rectangular edges of the planar members through said planar side of said body of said corner moulding.

14. The corner construction of claim 13, wherein the means of attaching each said substantially rectangular edge of said planar members to said v-shaped channels are nails embedded into the substantially rectangular edges of the planar members through said planar side of said body of said corner moulding.

15. The corner construction of claim 12, wherein the means of attaching each said substantially rectangular edge of said planar member to said V-shaped channels is an adhesive placed between said substantially rectangular edges of said planar member and said V-shaped channels of said corner moulding.

16. The corner construction of claim 10, further including:
   at least one hole formed in each V-shaped channel of said body of said corner moulding;
   at least one hole formed in each said substantially rectangular edge of said planar members; and
   a plurality of dowels, each said dowel rigidly fastened in one of said holes in said V-shaped channels and a respective said hole in said rectangular edge of said planar members.

17. The corner construction of claim 10, whereby an outer edge is formed between said first side and each said V-shaped channel, and wherein said outer edges are rounded.

18. A method of constructing a corner for furniture or the like, comprising the steps of:
   providing a corner moulding, including an elongate body having an interior, a first side defining an arcuate surface, and a second side opposite the first side, the elongate body further having a pair of V-shaped channels extending along the length of the body, each channel being defined between the first side and the second side, each said V-shaped channel defining first interior wall adjacent said first side and a second interior wall adjacent said first interior wall, and said first interior wall and second interior wall defining an acute angle therebetween, and an outer edge formed between the first side and each V-shaped channel, wherein the second interior wall of each said V-shaped channel is perpendicular to a radial line defining an end point of the arc defining the arcuate surface of said first side, and said first interior wall of the respective said V-shaped channel intersects said radial line,
   placing a substantially rectangular edge of a first planar member into one V-shaped channel of the corner moulding;
   moving the moulding and the planar member relative to one another until the planar member abuts the outer edge of the moulding formed between the first side and the respective channel, with a planar surface of the first planar member abutting and parallel to the second interior wall of the channel; and
   attaching the substantially rectangular edge within the V-shaped channel of the corner moulding.

19. The method of claim 18, wherein the step of attaching the substantially rectangular edges of the planar members is embedding a screw into the substantially rectangular edge of the planar member through the second side of the body of the corner moulding.

20. The method of claim 18, wherein the step of attaching the substantially rectangular edges of the planar members is embedding a nail into the substantially rectangular edge of the planar member through the second side of the body of the corner moulding.

21. The method of claim 18, wherein the step of attaching the substantially rectangular edges of the planar members is placing an adhesive between the V-shaped channels of the body and the substantially rectangular edges of the planar members and forcing the substantially rectangular edges into contact with the adhesive and the V-shaped channels of the body of the corner moulding.

22. The method of claim 18, further including the steps of:
   forming at least one hole in the substantially rectangular edge of the planar members;
   forming at least one hole in each V-shaped channel of the body of the corner moulding;
   placing a dowel within the hole in the substantially rectangular edge and within a respective hole in the V-shaped channel; and
   securing the dowel within each hole in the substantially rectangular edge and a respective hole in the V-shaped channel of the body to thereby secure the planar member to the corner moulding.

* * * * *